3,447,914
VISCOUS FLAMMABLE COMPOSITIONS
Alan H. Peterson and Grover L. Farrar, Littleton, Colo., assignors to Marathon Oil Company, Findlay, Ohio, a corporation of Ohio
No Drawing. Filed Aug. 8, 1966, Ser. No. 574,267
Int. Cl. C10l 7/02
U.S. Cl. 44—7      3 Claims

ABSTRACT OF THE DISCLOSURE

Viscous flammable compositions comprising gasoline with a polynuclear aromatic concentrate and a polymeric material selected from the group consisting of polystyrene and ethylcellulose.

---

The present invention relates to new viscous flammable compositions and processes for their manufacture, and in particular relates to new compositions containing gasoline-range petroleum cuts and polynuclear aromatic concentrate, together with thickening agents which are substantially insoluble in gasoline.

The processes for thickening normally-liquid hydrocarbons to make make them suitable for use as gelled fuels and as incendiary materials for dropping from airplanes or for use in flame-throwers, specialized missiles, etc. are well known. Previous processes have utilized a wide variety of thickening agents to increase the viscosity of the liquid hydrocarbons. Among such conventional thickening agents are natural and synthetic rubber, aluminum soaps, fatty acids and similar materials. The present invention provides new processes and compositions for controlled viscosity, flammable hydrocarbon-containing mixtures which when compared to the formulations generally previously available have the advantage of (a) higher heat per unit of volume, thus permitting more destructive or propulsive energy to be stored in existing conventional containers and devices, (b) the components of the present invention are cheaper than the materials previously most commonly used, and (c) the compositions of the present invention requires less thickening agent than the most widely used formulations now available.

Presently, most formulations of the "Napalm" variety consist primarily of gasoline (petroleum hydrocarbon cuts ranging from approximately $C_4$ to about 400° F. end boiling point), polystyrene thickeners, and benzene which is necessary as a co-solvent to permit the dissolving of sufficient quantities of polystyrene to obtain the desired viscosity range, roughly from 100 to about 10,000 poises as measured at room temperature with a shear rate of approximately 35 seconds$^{-1}$.

According to the present invention, polynuclear aromatic concentrates obtainable from catalytically cracked petroleum fractions can be utilized as co-solvents with gasoline to permit the production of viscous flammable compositions having the desired viscosities with reduced amounts of thickening agent. The polynuclear aromatic concentrates utilized with the present invention are obtained by catalytically cracking a petroleum fraction of the type generally referred to as "gas-oil" and obtained from a crude distillation unit (usually as the highest boiling distillate fraction) or from a coker or elsewhere in the refinery process. These "gas-oils" are conventionally catalytically cracked and the product boiling in the general range of from about 400 to 700° F. is extracted by liquid-liquid contact with a solvent suitable for removal of aromatics, e.g. according to the process of French Patent 1,424,225 to A. L. Benham. The selective solvent is then removed by distillation, or other conventional stripping technique and the aromatic extract is recovered.

This extract boils at from about 400 to about 700° F. and consists primarily of polynuclear compounds, principally alkylnaphthalenes, with indenes, tetralins, and with less than about 15% alkylbenzenes. A similar polynuclear aromatic concentrate is obtainable as heavy reformer bottoms, particularly where the reformer is operating under relatively severe reforming conditions.

The present invention embodies the discovery that partial, or preferably total, substitution of such aromatic hydrocarbon for the conventionally employed benzene permits attaining required viscosities by using less of the polystyrene which is the most expensive ingredient in such viscous flammable formulations. In addition, a further cost saving is achieved because the aromatic hydrocarbons disclosed are themselves generally cheaper than the benzenes for which they are substituted. Further, under current commercial conditions, benzene is in relatively short supply due to its use for other purposes.

The polymeric thickening agents for use with the present invention include those polymers which are soluble in mixtures of gasoline and the polynuclear aromatic concentrate described above, but are not sufficiently soluble in gasoline alone to produce viscosities in the desired ranges. Polystyrene and ethyl cellulose are examples of the available commercial products found to be suitable for use as the polymeric thickening agent of the present invention.

From 0.3 to about 3.0 parts by weight of polynuclear aromatic concentrate will generally be used for each part of gasoline. More preferably from 0.5 to about 2 and most preferably from 0.8 to about 1.4 parts of polynuclear aromatic concentrate will be used for each part by weight of gasoline. These ratios will vary somewhat according to the viscosity control necessary and the polymeric material being utilized as the thickener. From about 0.05 to about 4 parts of thickener will be employed for each part by weight of polynuclear aromatic concentrate, with thickener to polynuclear aromatic concentrate ratios of from about 0.1 to about 3 being more preferred.

The invention will be more fully understood by reference to the examples which follow. These examples are merely illustrative and serve to point up the uniqueness of the methods and compositions of the present invention. However, they should not be taken as being limitative of the extent of the invention which is to be defined only by the claims appended hereto.

EXAMPLE I

Polystyrene (50 parts by weight) is dissolved in Marathon Aromatics 4065, an aromatic extract obtained according to the process of French Patent 1,424,225 by extraction of a catalytically cracked product fraction boiling from about 400 to 650° F. with an extractant comprising dimethylformamide and thereafter stripping off the dimethylformamide and recovering the aromatic extract (25 parts) by warming and mixing. This solution is cooled and gasoline (regular grade, 25 parts) is added and the mixture stirred until homogeneous. The product is more viscous than a similar preparation using benzene in place of the Marathon Aromatics.

EXAMPLE II

Following the procedure of Example I, a jellied gasoline formulation is prepared from polystyrene (50 parts), Marathon Aromatics 4065 from Example I (30 parts) and gasoline (30 parts). This product is similar in viscosity to the benzene formulation in Example I.

EXAMPLE III

A formulation consisting of polystyrene (50 parts), Marathon Aromatics 4065 from Example I (40 parts)

and gasoline (40 parts) was somewhat thinner than the benzene formulation of Example I.

EXAMPLE IV

When the procedure of Example I is repeated, except that the polystyrene, gasoline and polynuclear aromatic concentrate are each added separately and are then all mixed together, with all ingredients being at room temperature, a product identical with that of Example I is produced.

EXAMPLE V

To illustrate the ability of the compositions of the present invention to achieve a given viscosity with a lower amount of polystyrene thickening agent, the viscosities of various compositions produced according to Examples I through III are determined and tabulated as Table 1 below:

TABLE 1

| Sample (101731) | Polystyrene, g. | Marathon aromatics, g. | Benzene, g. | Gasoline, g. | Viscosity |
|---|---|---|---|---|---|
| 1 | 50 | 50 | | 50 | 119 |
| 3 | 50 | 40 | | 40 | 252 |
| 5 | 50 | 30 | | 30 | 612 |
| 7 | 50 | 25 | | 25 | [1]1,538 |
| 9 | 50 | | 25 | 25 | [1]787 |

[1] Average.

All viscosities are in poises and are determined at shear rates of 34.9 seconds$^{-1}$.

EXAMPLE VI

Ethyl cellulose (Hercules Powder Co., Wilmington, Del., type N–50, 25 parts by weight) is dissolved in 75 parts of Marathon Aromatics 4065 and 50 parts of regular grade gasoline by mixing together at room temperature. The resultant solution is very viscous, and is flammable.

EXAMPLE VII

To illustrate the relatively few operable combinations of aromatic extract-gasoline-polymeric compositions, a variety of such polymeric compositions were mixed with varying ratios of polynuclear aromatic concentrate and gasoline with the results as tabulated in Table 2 below:

TABLE 2

| Thickening agent | Parts by weight of thickening agent | Parts by weight of aromatic extract | Results |
|---|---|---|---|
| Polymethylmethacrylate | 50 | 25 | Insufficiently soluble at 150° F. |
| Polyacrylamide | 50 | 50 | Insoluble 75° F. |
| Cellulose gum (Hercules 7AP). | 50 | 50 | Do. |
| Cellulose nitrate | 50 | 50 | Insoluble 150° F. |
| Polyisobutylene | 20 | 150 | Swelled 75° F. |
| Polyethyleneglycol | 50 | 50 | Insoluble 150° F. |
| Hydroxypropylmethyl cellulose (Dow 4000 CPS). | 25 | 50 | Do. |
| Methylvinyl ether-maleic anhydride copolymer. | 25 | 60 | Do. |
| Acrylonitrile-butadiene-styrene copolymer. | 50 | 25 | Swelled 150° F. |
| Polycarbonate | 50 | 25 | Insoluble 150° F. |
| Polypropylene | 50 | 25 | Do. |

What is claimed is:
1. Viscous flammable compositions comprising commercial gasoline with from about 0.3 to about 3.0 parts by weight of a polynuclear aromatic concentrate having a boiling range between about 400 and 700° F. for each part by weight of commercial gasoline and polymeric material which is soluble in said polynuclear aromatic concentrate-gasoline mixture, but is substantially insoluble in gasoline; said polymeric material being present in sufficient quantity to cause the composition to have a viscosity of from about 100 to 10,000 poises and wherein the polymeric material comprises a material selected from the group consisting of polystyrene and ethylcellulose and the composition consists essentially of from about 0.3 to about 3.0 part by weight of gasoline per part of polynuclear aromatic concentrate and from about 0.5 to about 3.0 parts of polymeric material per part of aromatic extract.

2. The composition of claim 1 in which the polymeric material consists essentially of polystyrene.

3. The composition of claim 1 in which the polymeric material consists essentially of ethylcellulose.

References Cited

UNITED STATES PATENTS

| 2,873,178 | 2/1959 | Biswell | 44—7 |
| 2,927,849 | 3/1960 | Greblick et al. | 44—62 X |
| 3,183,068 | 5/1965 | Monick | 44—7 |

DANIEL E. WYMAN, *Primary Examiner.*

C. F. DEES, *Assistant Examiner.*